United States Patent [19]

McMurtry et al.

[11] Patent Number: 5,101,548
[45] Date of Patent: Apr. 7, 1992

[54] APPARATUS FOR CHANGING A SENSING DEVICE

[75] Inventors: David R. McMurtry, Wotton-Under-Edge; Peter J. Wells, Nympsfield; Richard H. Lewis, Horfield, all of United Kingdom

[73] Assignee: Renishaw plc, England

[21] Appl. No.: 592,059

[22] Filed: Oct. 1, 1990

Related U.S. Application Data

[62] Division of Ser. No. 382,632, filed as PCT/GB88/01079, Dec. 5, 1988, Pat. No. 4,979,284.

[30] Foreign Application Priority Data

Dec. 5, 1987 [GB] United Kingdom ............... 8728501
Jun. 22, 1988 [GB] United Kingdom ............... 8814778
Jun. 28, 1988 [GB] United Kingdom ............... 8815395
Oct. 11, 1988 [GB] United Kingdom ............... 8823812

[51] Int. Cl.$^5$ .......................................... B23Q 3/155
[52] U.S. Cl. ...................................... 29/568; 211/1.5; 901/41
[58] Field of Search ............... 29/568, 26 A; 408/35; 33/560; 901/30, 31, 41, 45; 211/1.5; 414/729, 730, 750

[56] References Cited

U.S. PATENT DOCUMENTS

| 2,674,513 | 4/1954 | Bowditch et al. ............ 29/568 X |
| 4,041,601 | 8/1977 | Schimanski ..................... 29/568 |
| 4,135,245 | 1/1979 | Kemplin et al. . |
| 4,153,998 | 5/1979 | McMurtry . |
| 4,321,746 | 3/1982 | Grinage ......................... 29/568 |
| 4,349,946 | 9/1982 | McMurtry . |
| 4,486,928 | 12/1984 | Tucker et al. . |
| 4,499,650 | 2/1985 | Cannon et al. ............ 211/1.5 X |
| 4,543,032 | 9/1985 | Leverett et al. . |
| 4,551,953 | 11/1985 | Lewandowski ............ 29/568 X |
| 4,604,787 | 8/1986 | Silvers, Jr. . |
| 4,616,397 | 10/1986 | Yasukawa ................. 211/1.5 X |
| 4,637,119 | 1/1987 | Schneider et al. . |
| 4,649,623 | 3/1987 | Schneider et al. . |
| 4,654,953 | 4/1987 | Hobbs .......................... 29/568 |
| 4,674,172 | 6/1987 | Botimer . |
| 4,688,307 | 8/1987 | Schneider et al. . |
| 4,702,013 | 10/1987 | McMurtry . |
| 4,759,114 | 7/1988 | Babel ...................... 211/1.5 X |
| 4,761,877 | 8/1988 | Rupp ............................ 29/568 |

FOREIGN PATENT DOCUMENTS

| 0142373 | 5/1985 | European Pat. Off. . |
| 3514167 | of 1986 | Fed. Rep. of Germany . |
| 8603737 | 5/1986 | Fed. Rep. of Germany . |
| 66843 | 4/1982 | Japan . |
| 8603829 | 7/1986 | PCT Int'l Appl. . |
| 1237367 | 6/1986 | U.S.S.R. . |
| 2047133 | 11/1980 | United Kingdom . |
| 2124110 | 2/1984 | United Kingdom . |
| 2176136 | 12/1986 | United Kingdom . |

Primary Examiner—William Briggs
Attorney, Agent, or Firm—Oliff & Berridge

[57] ABSTRACT

A device for changing styli or probes in a coordinate measuring machine has a magazine (330) with several stations each holding a stylus or probe (320). A holder (310) on the quill of the coordinate measuring machine has an opening (313A), so that kinematic support elements (325) in the holder (310) can be moved underneath cooperating kinematic support elements (324) on the stylus (320). When the holder (310) is engaged in the magazine (330), an extension plate (334) causes the arm (314) to swing out of the way. This arrangement enables the holder (310) to pick up the stylus (320) purely by translational movements of the holder (310), without the need for any separate motor or electromagnet to couple the stylus to the holder.

13 Claims, 11 Drawing Sheets

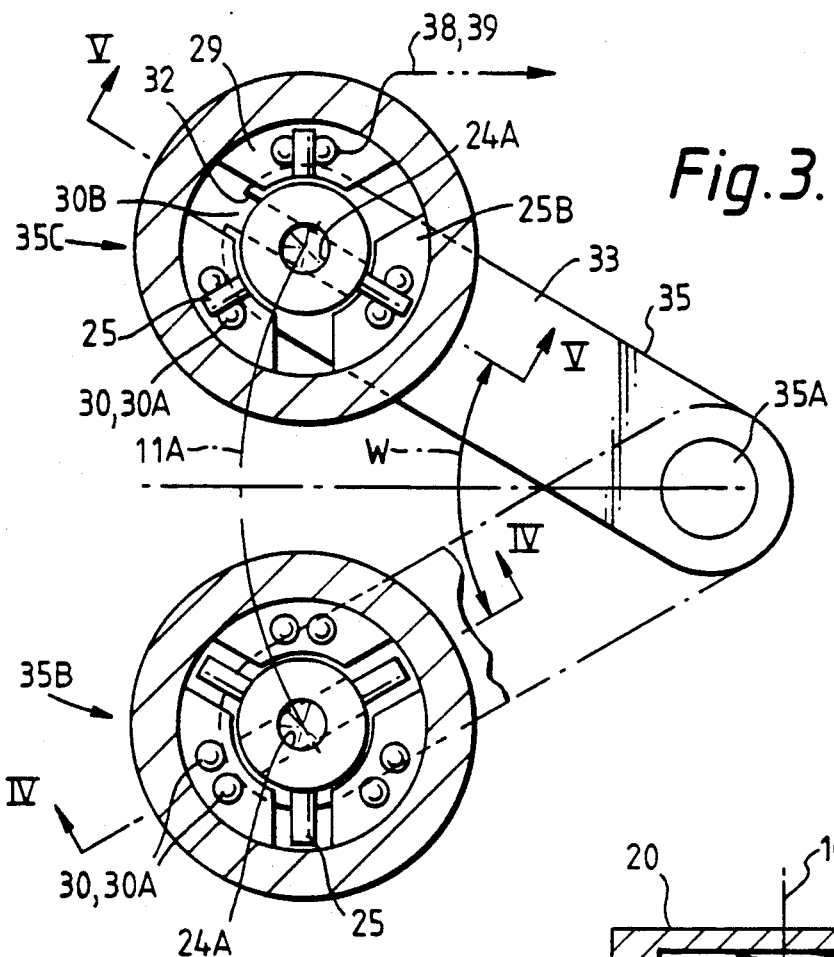
Fig.3.
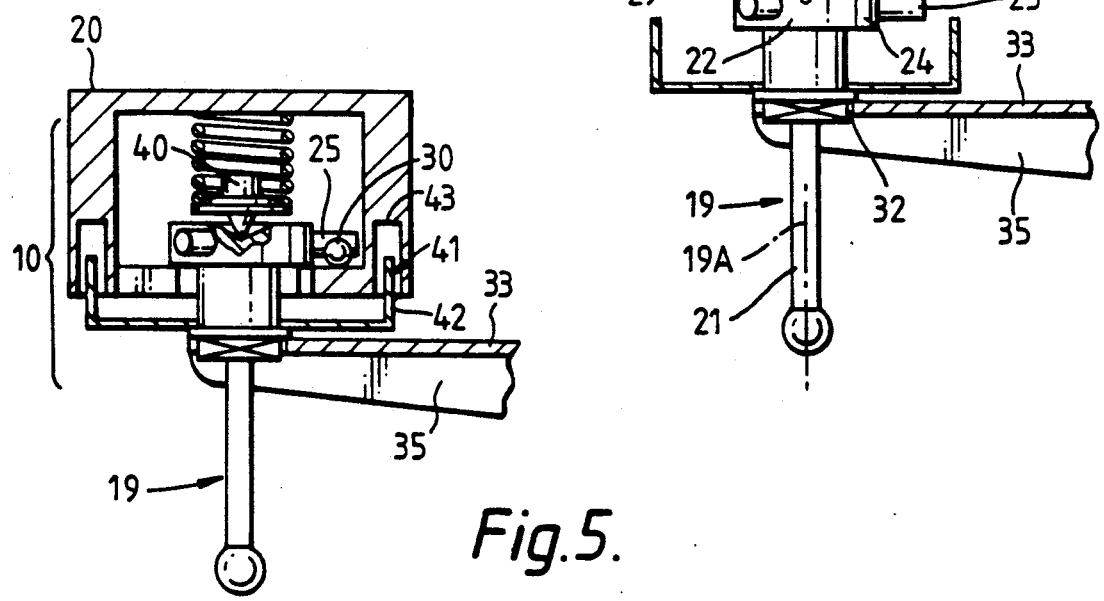
Fig.4.
Fig.5.

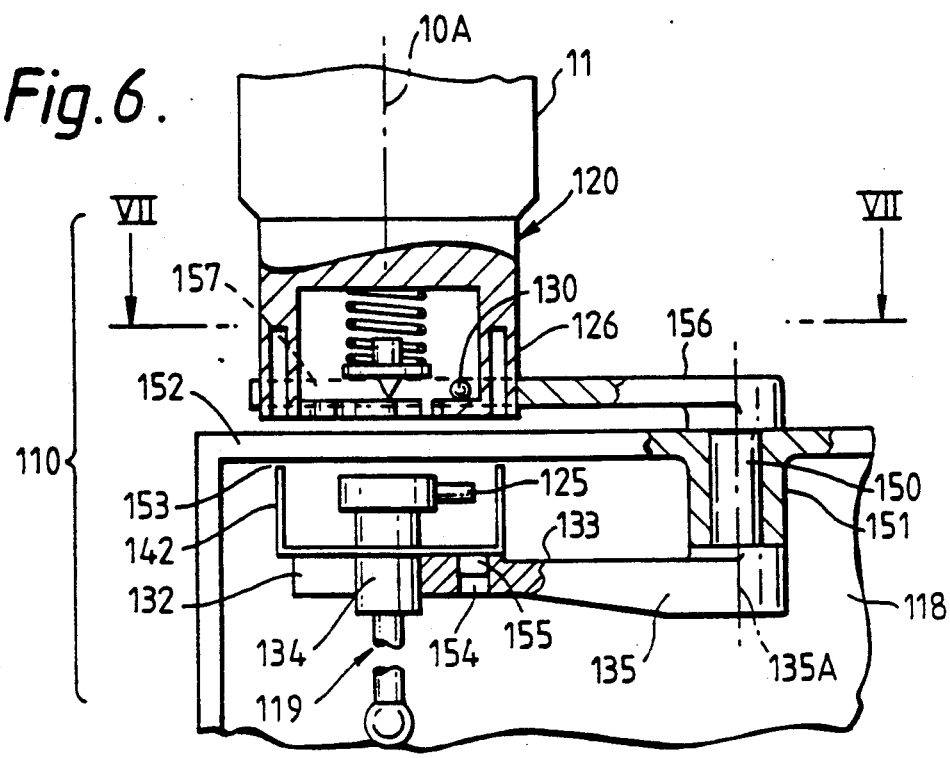
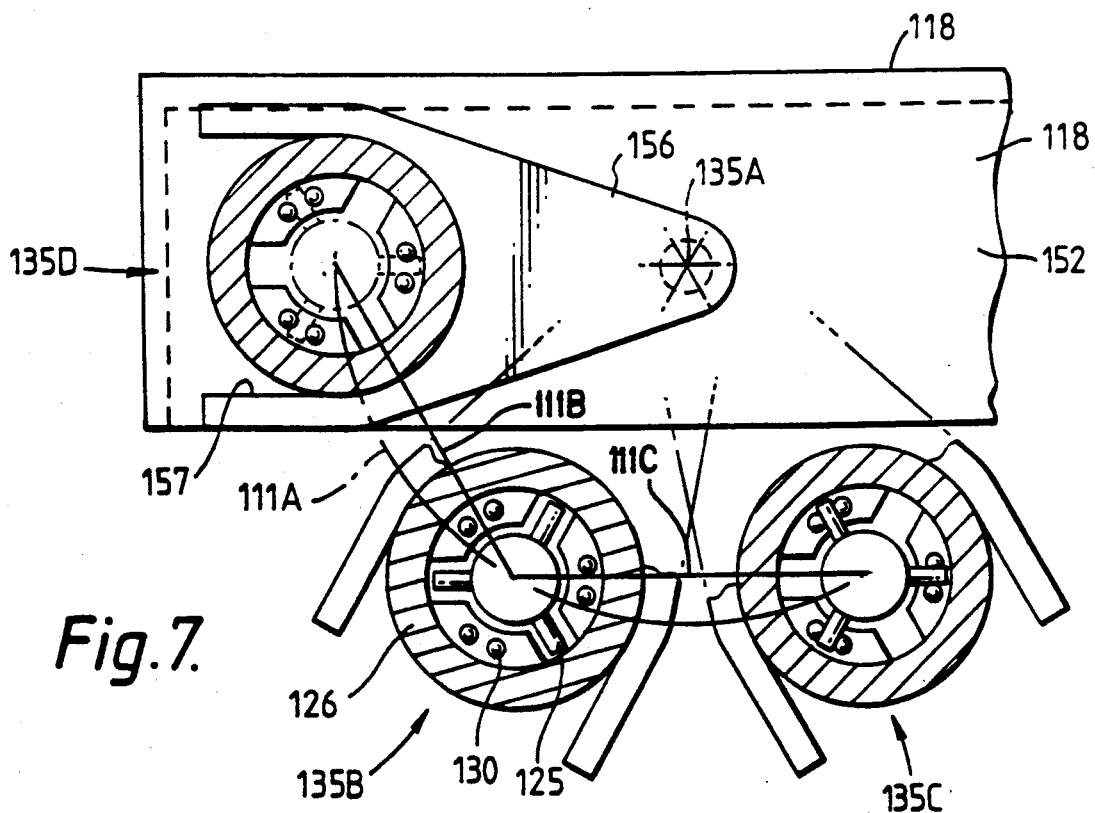

APPARATUS FOR CHANGING A SENSING DEVICE

This is a division of application Ser. No. 07/382,632, filed as PCT/GB88/01079, Dec. 5, 1988, now U.S. Pat. No. 4,979,284.

This invention relates to apparatus for changing a sensing device in a positioning machine, such as a coordinate measuring machine, machine tool or inspection robot.

Such apparatus is known, and comprises:

a magazine having means for releasably supporting the sensing device in a stored position;

a holder which is capable of translational movement by the positioning machine, relative to the magazine and to a workpiece, for removal of the sensing device from the magazine, performance of a sensing operation on the workpiece, and return of the sensing device to the magazine;

means for releasably coupling the sensing device to the holder, comprising first support elements provided on the holder, second support elements provided on the sensing device and engageable with the first support elements, and releasable bias means for urging the first and second support elements into engagement with each other; and means for actuating the coupling means between a coupled state (in which the bias means urge the first and second support elements into engagement with each other) and an uncoupled state (in which the bias means are released and the holder is separated from the sensing device with the sensing device supported in the magazine) in order to couple and uncouple the sensing device and the holder.

In the known apparatus, the actuating means has a separate operating means, located either in the holder or in the magazine.

For example, in GB 2047133 (Renishaw), the coupling means is in the form of a bayonet joint, and the holder includes a motor for rotating the holder relative to the sensing device stored in the magazine, in order to actuate the bayonet joint. In U.S. Pat No. 4,649,623 (Zeiss), the coupling means includes an electromagnet in the holder, which forms part of the bias means for urging the first and second support elements into engagement. Both these known arrangements thus require an operating means (a motor or electromagnet) in the holder. There is a difficulty in making the necessary electrical connections to such an operating means in the holder, bearing in mind that the holder is movable. Furthermore, the operating means increases the mass of the holder, so that the positioning machine is more subject to inertial deflections when the holder is accelerated. Since such deflections reduce the accuracy of measurement, the mass of the holder is one of the limiting factors on the speed at which measurement can be made.

In EP 0142373 (Renishaw), on the other hand, such problems are overcome by providing the operating means within the magazine itself. The magazine includes a screwdriver-type operating member, driven by a motor, which engages and operates the coupling means when the holder picks up or puts down a sensing device in the magazine. However, this results in a more complicated and expensive magazine, and the need to ensure correct operating engagement between the screwdriver and the coupling means.

In one aspect, the present invention is characterised in that the actuating means is operable by the relative translational movement between the holder and the magazine. Such relative translational movement is in any case an operational requirement in a positioning machine, and therefore the preferred embodiments of the present invention do not require any separate motor or electromagnet in the holder or in the magazine.

Preferred embodiments of the invention will now be described with reference to the accompanying drawings, wherein:

FIG. 3 is an enlarged detail of FIG. 2.

FIG. 4 is a section on the line IV—IV in FIG. 3.

FIG. 5 is a section on the line V—V in FIG. 3.

FIG. 6 is a view similar to FIG. 4 but shows a first modification.

FIG. 7 is a section on the line VII—VII in FIG. 6 and shows different operational positions.

Figure 1:
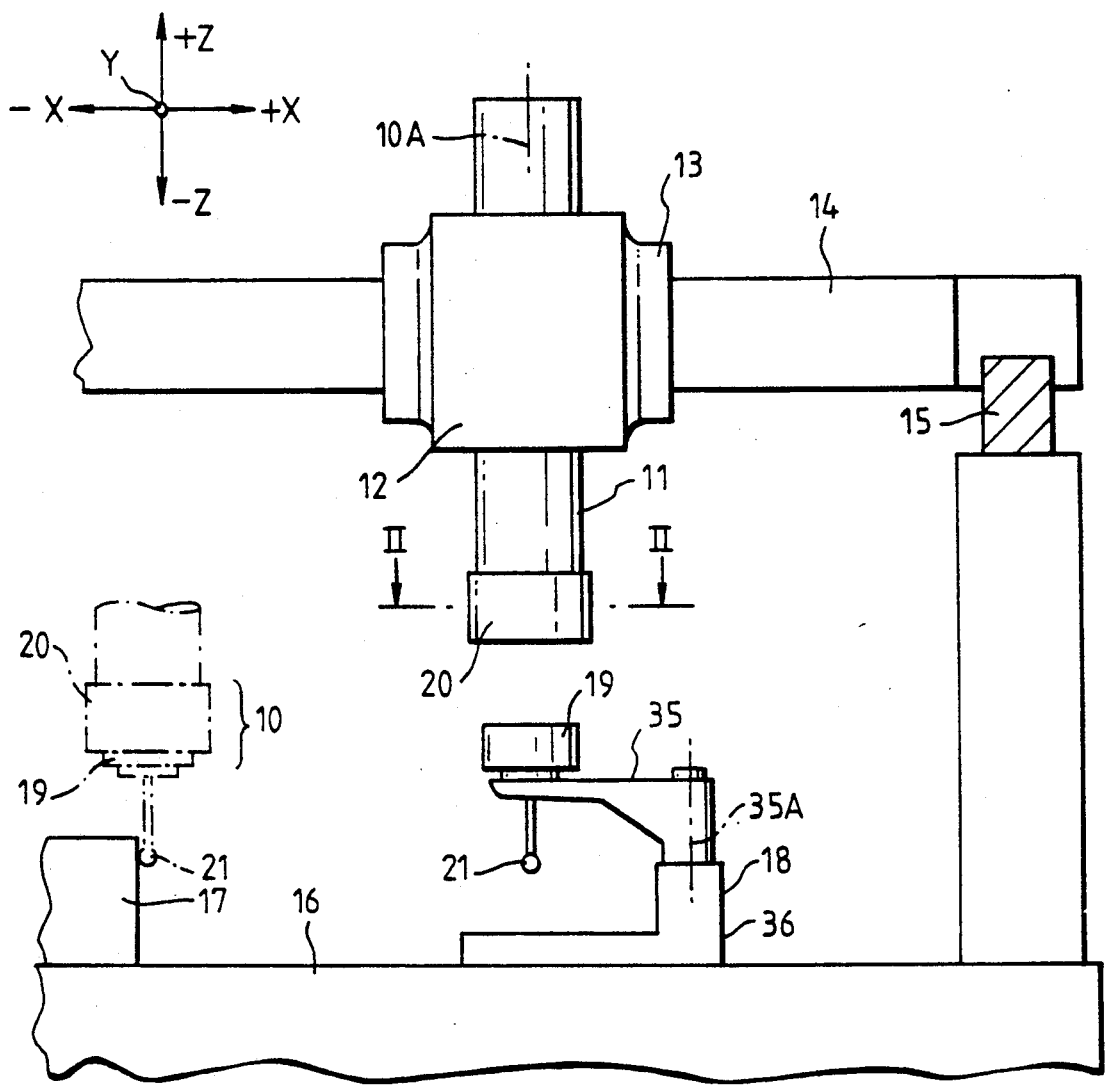
FIG. 1 is an elevation of a positioning machine including the connecting mechanisms.

FIG. 1 shows a coordinate measuring machine having an arm member or quill 11 supported for translational motion only in the X, Y and Z-direction of the orthogonal coordinate system. In the example the arm member or quill 11 is a vertically disposed elongate member, supported for longitudinal motion in the Z-direction in a bearing 12 integral with a carriage 13 supported for motion in the X-direction along a beam 14 itself supported for motion in the Y-direction along a beam 14 itself supported for motion in the Y-direction on a track 15 mounted on a table 16 on which a workpiece 17 to be measured is supported. The member 11, carriage 13 and beam 14 are adapted to be driven translationally by motors (not shown) through any preselected linear or curved path under the control of an appropriately programmed computer (not shown), this being well-understood per se.

Measurements are performed by means of a probe unit 10 having an axis 10A and comprising a holding unit 20 and a stylus unit 19. The holding unit is secured to the member 11. The stylus unit 19 is one of a number of such units adapted for different measuring operations and held in a magazine 18 supported on the table 16. The computer is programmed to drive the member 11 to perform measuring operations and to transfer any one of the units 19 between the holding unit 20 and the magazine 18.

Figure 2:
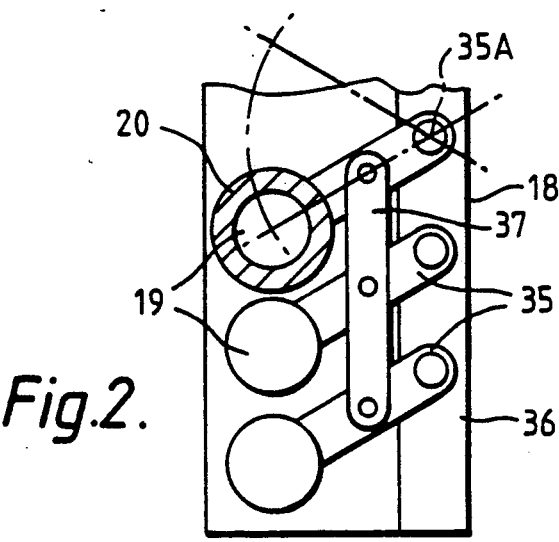
FIG. 2 is a view on the line II—II in FIG. 1.

Referring primarily to FIGS. 2 to 4, the unit 19 comprises a stylus 21 and a first connecting member 22. The holding unit 20 comprises a second connecting member 23 engageable with the member 22. The member 22 comprises a disc-shaped head 24 and three cylindrical arms 25 extending radially outwardly from the head 24 and being equi-spaced at 120° (FIG. 3). The arms 25 define open spaces 25B angularly therebetween. The member 23 comprises housing 26 which is open at its bottom end except for three inwardly extending flanges 29. Each flange has secured thereto a pair of spherical supports 30 defining between them a pair of converging surfaces 30A (FIG. 3). The pairs of supports 30 are also equi-spaced at 120 degrees about the axis 10A. The flanges 29 are discontinuous so as to define an open space 30B angularly between each two pairs of supports 30. The supports 30 and arms 25 define first and second support elements respectively. The upper end of the housing 26 has secured thereto one end of a compression spring 31 (FIG. 4). The other end of the spring 31 has secured thereto a pressure member 31A terminating at a pointed end 31B.

FIGS. 1 and 4 show the units 19, 20 in the disengaged condition but in alignment on the axis 10A. The unit 19 is supported (FIGS. 3 and 4) on a surface 33 of an arm 35 of the magazine 18. When it is required for the quill 11 to pick up the unit 19, the quill is lowered so that the elements 25, 30 pass through the spaces 30B, 25B (position 35B, FIG. 3) and the end 31B abuts the bottom of a conical recess 24A (FIG. 4) in the top of the head 24 the top of the head 24. Further lowering of the quill 11 compresses the spring 31 and brings the arms 25 into a position above the level of the spherical supports 30. The units 19, 20 are then rotated, one relative to the other, through 60° to bring the arms 25 into axial alignment with the respective pairs of convergent surfaces 30A, and the quill 11 is raised again whereby the spring 31 becomes free to urge the head 24 downward and thereby resiliently urge the arms 25 into engagement which the surfaces 30A. The arms 25 and convergent surfaces 30A constitute a kinematic support means ensuring, in cooperation with the spring 31, that the units 19, 20 are located against relative displacement transversely to and rotationally about the axis 10A, this condition being referred as the "rest position" of the stylus 21.

For the purpose of rotating the units 19, the magazine 18 comprises a plurality of said arms 35 each supported on a frame 36 for pivotal motion about a respective axis 35A extending in the Z-direction. The arms are connected by a link 37 so as to be moveable in mutually parallel relationship, though this link can be omitted if the arms 35 are sufficiently spaced apart. Detent means (not shown) are provided for locating the arms 35 with a light force at the position 35B and a further position 35C, (FIG. 3). The positions 35B, 35C define between them an angle W of 60°. Each arm 35 has a slot 32 in which the unit 19 is supportable against rotation relative to the arm so as to maintain the required orientation of the unit 19 relative to the supports 30.

The pivotal motion of the arms 19 is effected by operation of the machine to cause translational movement of the quill through 60° of an arc 11A about the axis 35A of the relevant arm 35. This causes said relative rotation between the units 19, 20 such that, on completion of the movement of the quill the elements 25, 30 are in alignment in the Z-direction as shown at position 35C. The quill is then raised whereby the elements 25, 30 come into engagement and the unit 19 becomes seated on the elements 30. The unit 19 can be returned to the magazine 18 by the reverse of the operations described.

When any of the stylus units 19 is engaged with the support unit 20 to constitute the probe assembly 10, the latter can then be used for measuring the workpiece 17 by the process of moving the quill 11 to engage the stylus 21 with any selected surface of the workpiece. The engagement generates a signal 39 (FIG. 3), and the position of said surface is determined from a reading of the position of the quill relative to a pre-selected datum at the instant of the signal 39. This process of signal generation is known per se. The signal 39 may be generated by connecting the supports 30 in an electric circuit 38 capable of being closed by the arms 25, the signal being generated when one or more of the arms 25 are displaced from the relevant supports 30 when, on engagement with the workpiece, the stylus is displaced from its rest position. Alternatively, a piezo-electric or other force-sensitive element 40 may be provided on the pressure member 31A for generating the signal 39 in response to the sound wave produced in the stylus on engagement with the workpiece.

The unit 19 includes a cup-shaped seal element 42 having an annular wall 42A forming a seal 41 (FIG. 5) with an annular groove 43 of the unit 20 thereby to protect the elements 25, 30 against ingress of dust into the housing 26.

Referring to FIGS. 6 and 7, there is shown a mechanism similar to that shown in FIGS. 1 and 5 but modified to provide protection of the stylus unit while in position in the magazine. Like parts are given like reference numerals preceded by the numeral 1. Thus there is shown a stylus unit 119 having arms 125 protected by an annular wall 142, and a holding unit 120 having supports 130 inside a housing 126 which, in this case, has a cylindrical exterior. The magazine, here denoted 118, has in respect of each unit 119 a lower arm 135 for the support of the unit 119. The modification is as follows.

The arm 135 is supported for pivotal motion about an axis 135A by means of a shaft 150 arranged in a bearing 151 provided on the magazine 118. The arrangement is such that in the stored position of the unit 119 in the magazine, the arm 135 has a position 135D (FIG. 7) such that the unit 119 is situated wholly beneath a horizontally disposed panel 152 of the magazine, and the arms 125 of the unit 119 are protected by the panel 152. In particular the upper edges of the wall 142 form a seal 153 with the underside of the panel 152 against the ingress of dust.

The unit 119 is supported on a surface 133 of the arm 135 while a cylindrical portion 134 of the unit 119 is in engagement with an open-ended slot 132 of the arm 135. A short pin 154 engages with a hole 155 to prevent rotation of the unit 119 relative to the arm 135.

Above the panel 152 the shaft 150 has secured thereto an upper arm 156 which is generally parallel to the lower arm 135. The arm 156 comprises an open-ended slot 157 dimensioned to receive the outside of the housing 126 in a position in which the units 119, 120 are in alignment on the axis 10A.

For the purpose of engaging the unit 120 with the unit 119 and removing the latter from the magazine, the computer is programmed to lower the member 11 translationally along the axis 10A into engagement with the slot 157 and thereafter move the member 11 translationally through an arc 111A sufficient for to bring the unit 119, which necessarily accompanies the movement of the arm 156, from the position 135D into a position 135B in which the unit 119 is clear of the panel 152. The member 11 is then further lowered. The housing 126 slides through the slot 156 into a position in which the supports 130 are below the level of the arms 125. Thereafter the movement of the member 11 through the arc 111A is continued by a further 60° with the result that the arms 125 attain a position of vertical alignment with the support 120. Thereafter the member 11 is raised to engage the arms 125 and supports 130, and further raising movement of the member 11 disengages the pin 154 from the hole 155. The unit 119 is now free to be removed from the arm 135 either by further raising of the member 11 or by movement of the member 11 in a direction out of the slots 132, 156.

Instead of being moved through the arc 111A, the member 11 may be moved along chords 111B, 111C to effect the pivotal motion of the arm 135 and, in the case of the chord 111C, to effect the relative rotation of the units 119, 120. However, such a manoeuvre requires the unit 120 to slide relative to the arm 156, and the slot 157 must be made sufficiently long to accommodate such sliding. Similarly, during movement of the member 11 along the chord 111C, the unit 119 has to slide along the slot 132 and the latter has to be sufficiently long to accommodate the sliding movement of the portion 132, the hole 155 being dispensed with and the pin 154 being adapted to slide along the appropriately extended slot 132.

It will be seen that the member 11 is used to perform two functions, viz. firstly, moving the arm 135 between the positions 135D, 135B for the purpose of moving the unit 119 out of and into the protected position below the panel 152 and, secondly, moving the arm 135 between the positions 135B, 135C for the purpose of relatively rotating the units 119, 120 for effecting their engagement or disengagement. These two functions may be carried out separately. For example, the first function i.e. the movement between the positions 135D, 135B, may be carried out by a solenoid or other motor device because here no relative rotation between the units 119, 120 is of significance.

Generally, in both examples described, the operation of engaging or disengaging the units 19, 119; 20, 120 is effected solely by translational movement of the member 11, i.e. by means of the motors already provided for moving the member 11 for measuring purposes, so that no additional electrical devices are required for effecting said engagement or disengagement.

It will be understood that instead of using the magazine 118 for storing stylus units 119, the magazine may store one or more probe units, i.e. units 110 each embodying a pair of units 119, 120 in a state of engagement, and where each unit 110 has further arms similar to the arms 125 for engagement with the supports 130 by manoeuvres similar to the movement of the member 11 between the positions 135D, 135B, 135C or 135B, 135C.

Referring to FIGS. 8 to 13, there is shown a mechanism similar to that shown in FIGS. 6 and 7 but showing a further or second modification. Like parts are given like reference numerals preceded by the numeral 2.

There is shown a stylus unit 219 having an axis 19A and a holding unit 220 having an axis 20A. The stylus unit 219 includes a stylus 221 and three extensions or arms 225 extending radially from the axis 19A. The arms 225 are formed by the corner portions of a triangular plate 224, and each has a spherical support element 225A on its underside. The corner portions act to cover and protect the elements 225A from dirt and damage. The unit 219 also includes a cup-shaped seal element 242.

The holding unit 220 includes a circular plate 229, and a housing 226 whose exterior is cylindrical at least at the lower end portion thereof. Three symmetrically spaced supports 230 are provided on the plate 229 in the form of three V-grooves extending radially from the axis 20A engageable kinematically by the respective elements 225A. The plate 229 has, at its center, a triangular cut-out 229A the corner portions of which define open spaces between each pair of V-grooves 230 so that the arms 225 can pass through this cut-out in operation. The upper end of the housing 226 has secured thereto one end of a compression spring 231. The other end of the spring 231 has secured thereto a pressure member 231A terminating at a pointed end 231B for engagement with the plate 224 to urge the elements 225A resiliently into engagement with the grooves 230.

The magazine, here denoted 218 has, in respect of each unit 219 to be stored therein, a lower arm 235 on which the unit 219 is supportable. Each arm 235 is supported for pivotal motion about an axis 235A of a shaft 250 arranged in a bearing 251 provided on the magazine 218. The arrangement is such that in the stored position of the unit 219 in the magazine, the arm 235 has a position such that the unit 219 is situated wholly beneath a horizontally disposed panel 252 of the magazine (FIGS. 8, 9), and the arms 225 of the unit 219 are protected by the panel 252. The free edges of the cup-shaped seal element 242 form a seal 253 with the underside of the panel 252 against the ingress of dust.

The unit 219 is supported on a surface 233 of the arm 235 while a neck 234 of the unit 219 is in engagement with an open-ended slot 232 of the arm 235. The neck 234 has parallel sides 254 which engage the slot 232 in a manner preventing rotation of the unit 219 relative to the arm 235.

Figure 8:
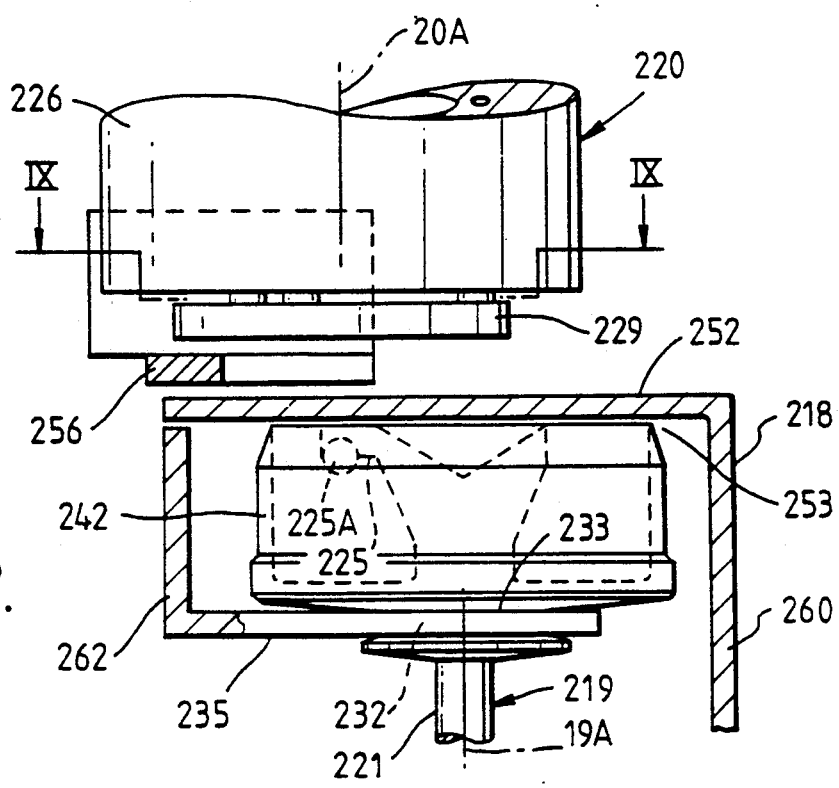
FIG. 8 is view similar to FIG. 6 but shows a second modification and shows a first operational position.

Above the panel 252 each shaft 250 has secured thereto an upper arm 256 which is generally parallel to the lower arm 235 (as seen in FIG. 8) and which comprises an open-ended slot 257 dimensioned to receive the outside of the housing 226 in a manner permitting rotation of the arm 256 relative to the housing 226. It is clear that the arms 235, 256 are movable jointly about the axis 235A. Relevant angular positions of the arm 235 during such movement and the corresponding positions of the unit 219, are denoted 19A1, 19A2, 19A3. The corresponding positions of the arm 256 and of the unit 220 are denoted 20A1, 20A2, 20A3.

Figure 9:
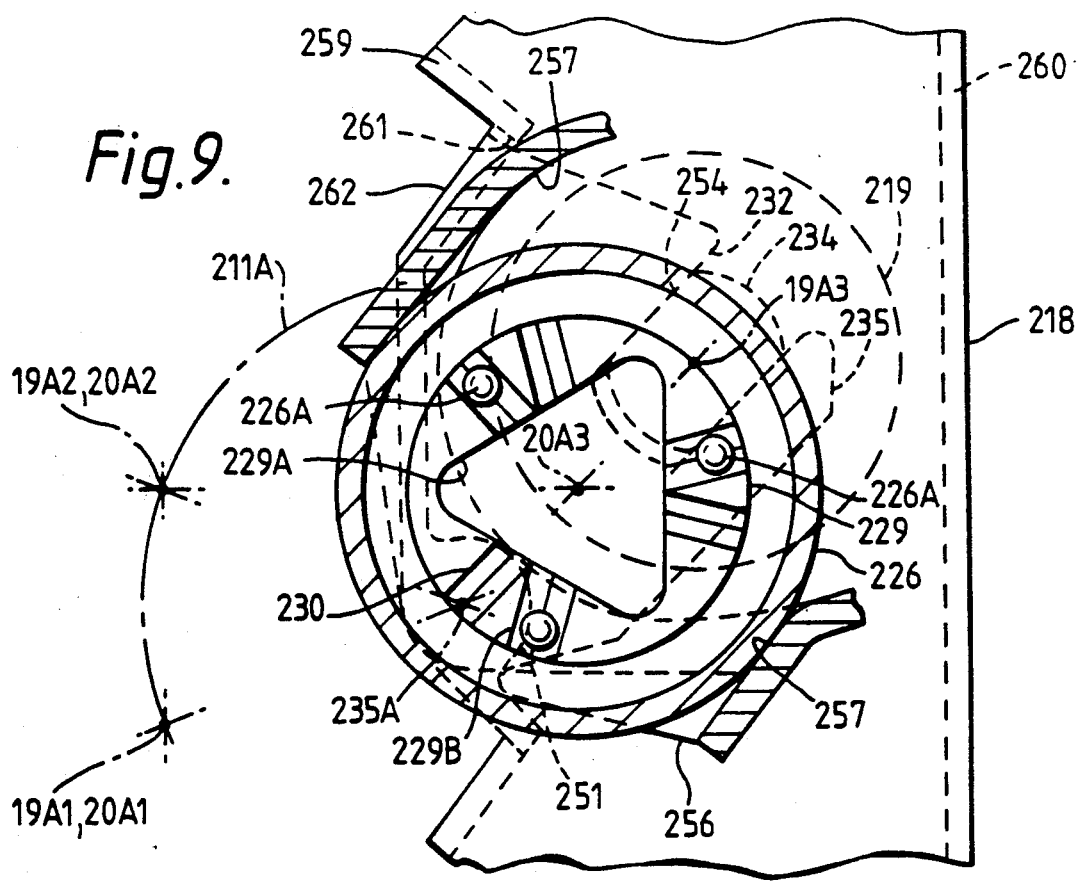
FIG. 9 is a section on the line IX—IX in FIG. 8.
Figure 12:
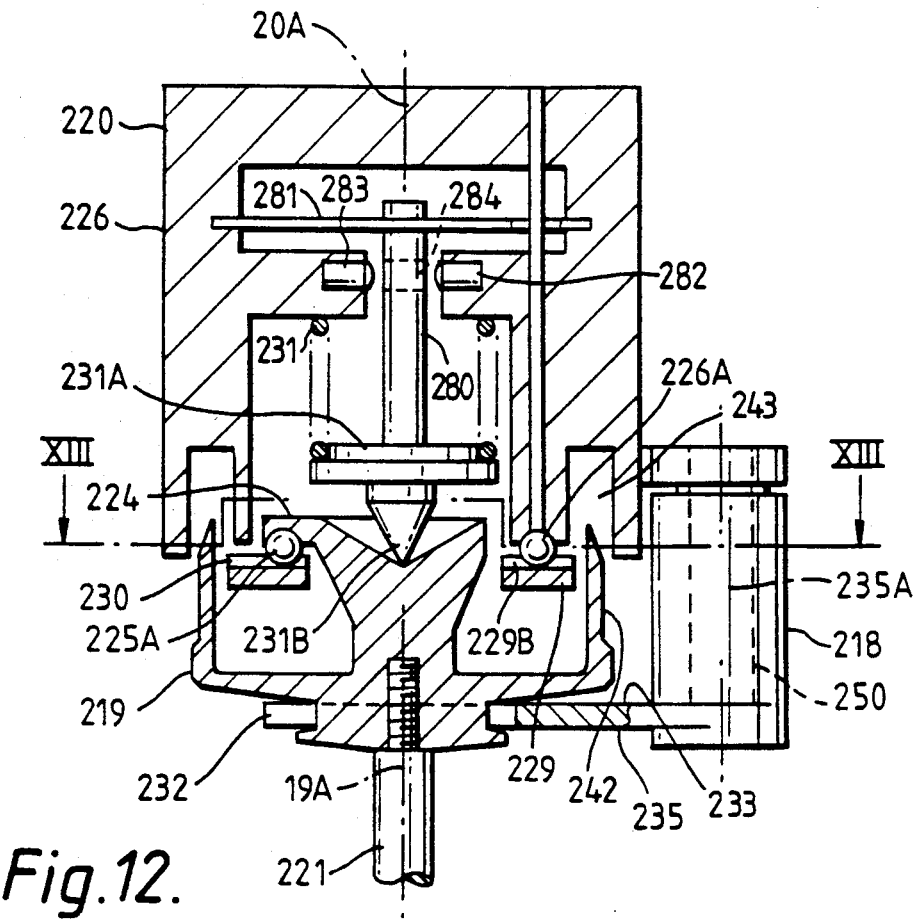
FIG. 12 is a view similar to FIG. 10 but shows a third operational position.
Figure 13:
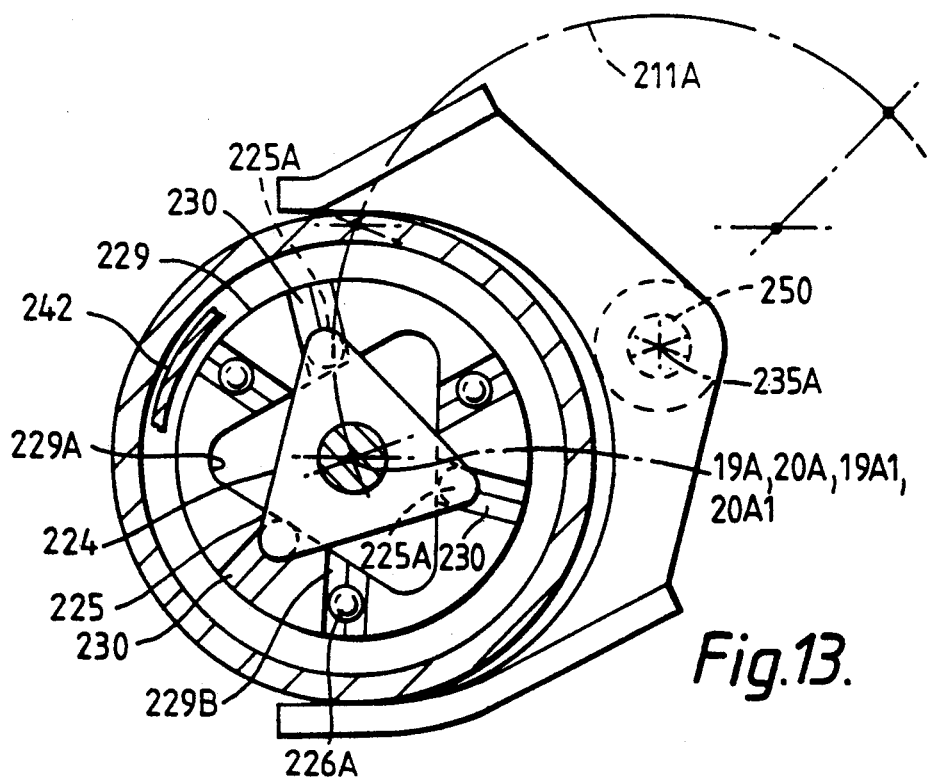
FIG. 13 is a section on the line XIII—XIII in FIG. 12.

For the purpose of engaging the unit 220 with the unit 219, the computer is programmed to lower the member 11 along the axis 20A into engagement with the slot 257 at the position 29A3, as seen in FIGS. 8 and 9. Thereafter, it translates the unit 220 linearly, firstly between the positions 20A3 and 20A2 (FIGS. 10, 11) and then between the positions 20A2 and 20A1 (FIGS. 12, 13). During those translations the housing 226 cooperates with the slot 257 to rotate the arm 256 and thereby rotate the arm 235 to move the unit 219 supported thereon through an arc 211A between the positions 19A3, 19A2 and 19A1 respectively. The directions of the translations between the positions 20A3, 20A2 and 20A2, 20A1 are aligned to the x and y directions of the translational motions of the machine (FIG. 1) so that the movement of the arm 235 can be effected conveniently by simple operation of the machine. In the positions 19A2, 20A3 it does not matter whether the axes 19A, 20A are in alignment but the arrangement is such that in the positions 19A2, 20A2 and 19A1, 20A1 the axes 19A, 20A are in alignment.

Figure 10:
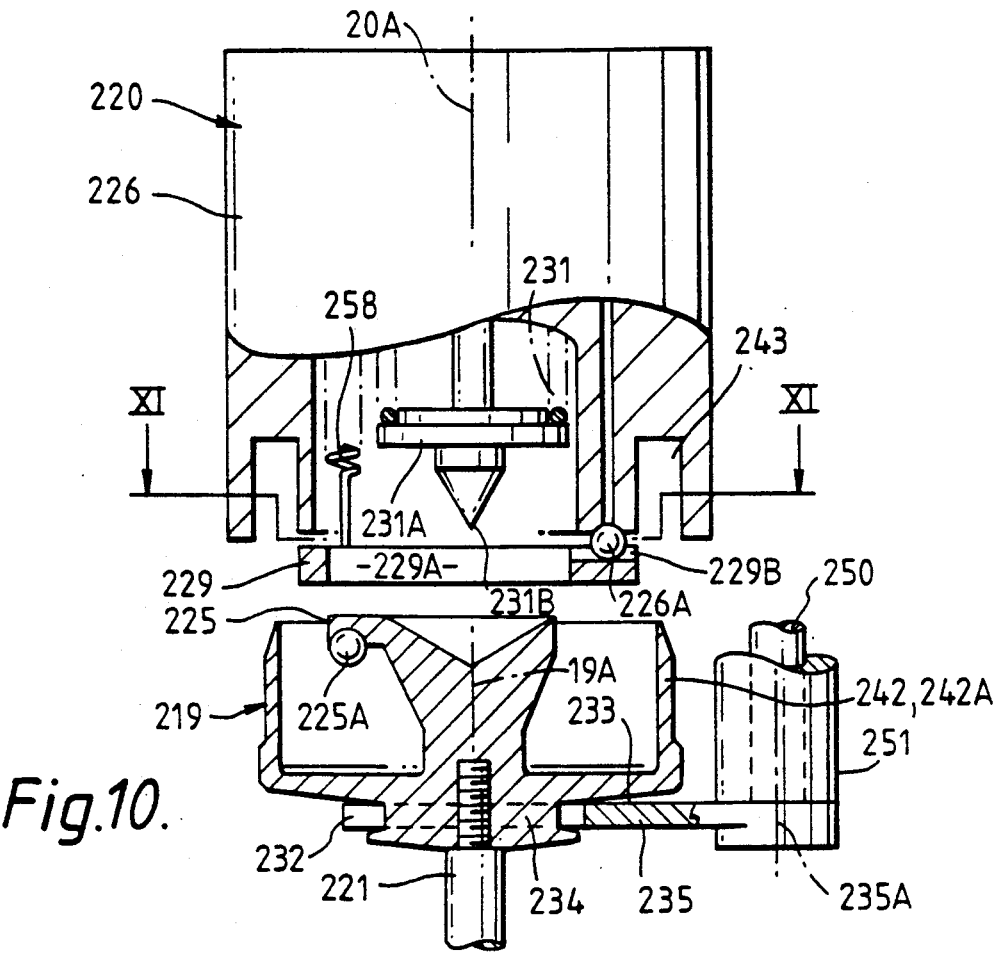
FIG. 10 is a view similar to FIG. 8 but shows a second operational position.
Figure 11:
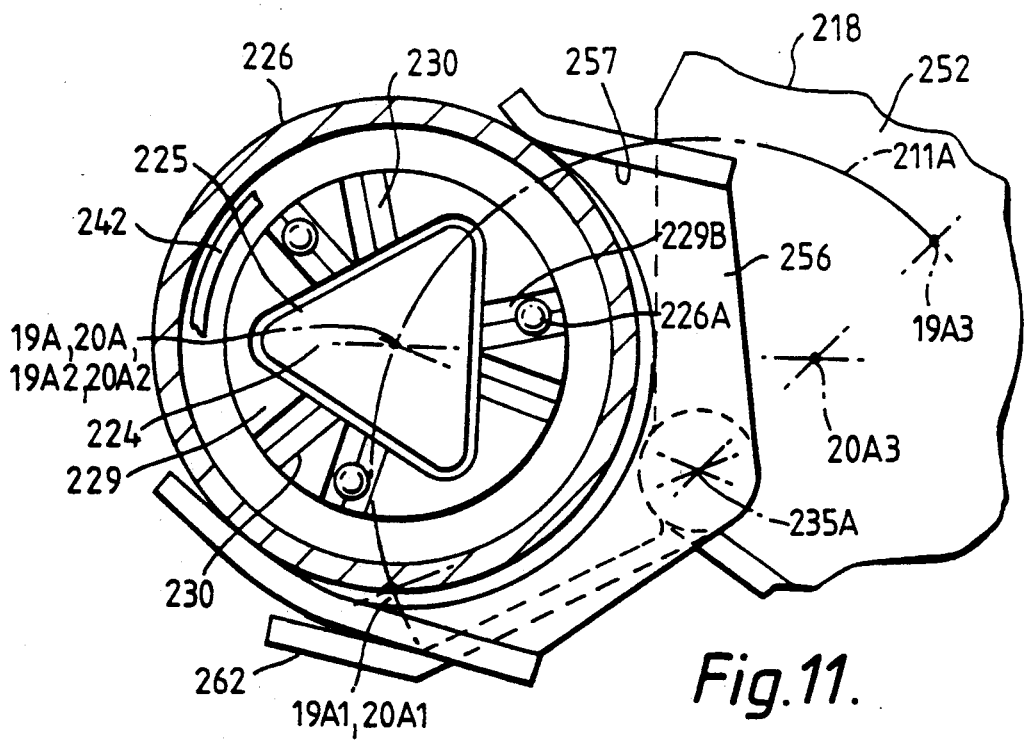
FIG. 11 is a section on the line XI—XI in FIG. 10.

During the translation of the unit 220 from the position 20A3 to the position 20A2 the unit 19 is moved from under the panel 252 into a position confronting the unit 220 (FIGS. 10, 11). The member 11 is then further lowered so that the housing 226 slides through the slot 257 into a position in which the supports 230 are below the level of the arms 225. Thereafter linear movement of the member 11 to translate the unit 220 from the position 20A2 to the position 20A1 causes the arm 235 to rotate through 45° relative to the unit 220 with the result that the arms 225 attain a position of vertical alignment with the supports 230 (FIGS. 12, 13). Thereafter the member 11 is raised to engage the arms 225 and supports 230. The unit 219 is now free to be removed from the arm 235 by movement of the member 11 in a direction out of the slots 232, 256. The seal member 242 is received with a substantial gap in an annular groove 243 in the housing 226, in order form a seal while still permitting the stylus unit 219 to tilt.

Further details of the present modification will now be described.

The stylus 221 is displaceable relative to the plate 229 in directions ±X, ±Y and +Z, such displacements being accommodated by tilting of the plate 224 on the plate 229 or by axial translation of the plate 224 towards the housing 226, all these displacements being accommodated by compression of the spring 231. In the present modification the stylus is also displaceable in the −Z direction. This is achieved by the virtue of the plate 229 being supported on the housing 226 by three spherical elements 226A secured to the housing 226 and engaged respectively by three further V-grooves 229B in the plate 229. The grooves 229B are symmetrically spaced with respect to each other about the axis 20A, and angularly spaced from the grooves 230. The plate 229 is urged resiliently into the position of engagement with the elements 226A by three tension springs 238 (only one visible in FIG. 10) connected between the plate 229 and the housing 226. The −Z displacement is accommodated by extension of the springs 258. When the displacing forces cease the spring 231 or the springs 258, as the case may be, return the stylus unit to its original or rest position.

The pressure member 231A has an upwardly extending spigot 280, the top of which is displaceably steadied by a diaphragm 281. The spigot contains a lens 284 for focussing light from a light emitting diode 283 onto a photodetector 282. When the stylus 221 contacts a workpiece, the lens is disturbed slightly, and the resulting change in the output of the photodetector is easily.

The magazine 218 has vertical panels 259, 260 integral with the horizontal panel 252 to further enclose and protect the stylus units 219. The panel 259 has an opening 261 for access of the stylus units 219 to the stored position 19A3 and each arm 235 of the magazine 218 has secured thereto a door 262 which closes the opening when the respective stylus unit is in the stored position.

Figure 14:
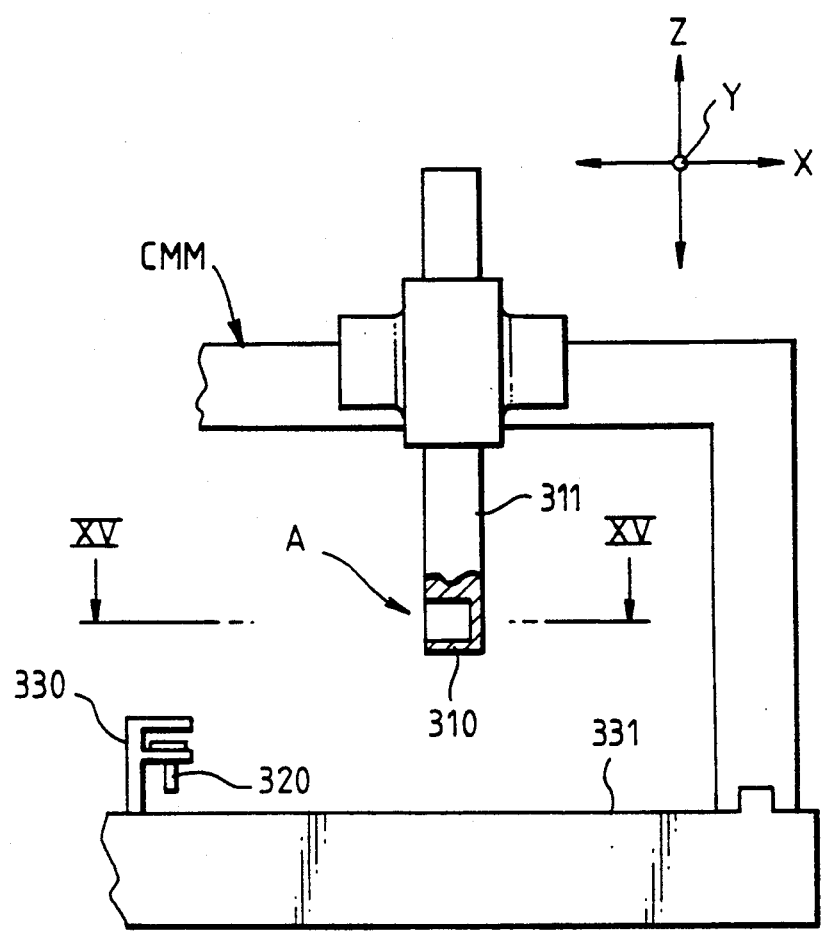
FIG. 14 is an elevation of a further positioning machine.
Figure 15:
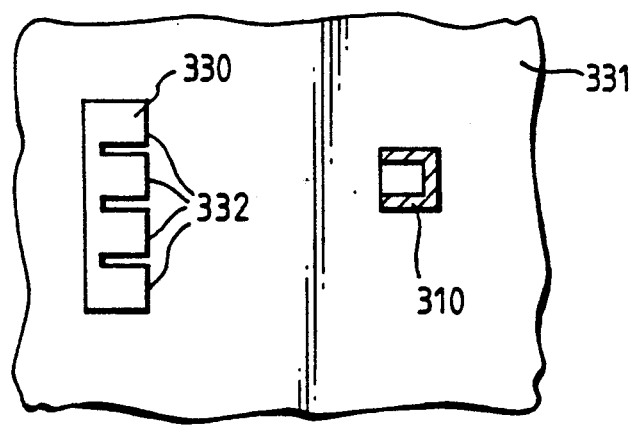
FIG. 15 is a section on the line XV—XV in FIG. 14.

Referring to FIG. 14 and 15, a coordinate measuring machine CMM comprises an elongate operating member or quill 311 supported on a base 331 for three-dimensional orthogonal movement in directions X, Y, Z. A magazine 330 provided on the base 331 is adapted to support a plurality of styli 320 at respective stations 332 of the magazine. A stylus holder 310 provided on the operating member 311 is adapted to be moved between any position A in the measuring field of the machine and a position B (FIG. 16) adjacent to any one of the stations 332.

At each station 332 (FIG. 16, 17), the magazine 330 comprises a support 333 for a said stylus 320. The stylus 320 comprises an elongate member 321 secured at one end to a plate 322. The plate 322 is provided at the side adjacent the member 321 with three elements 325 of which are provided on the stylus holder 310. The support 333 is fork-shaped in the sense of having two projections 333A for supporting the plate 322 at opposite sides of the member 321 and so that the stylus 320 can be withdrawn from the support 333 in a direction transverse to the length of the member 321. A light leaf spring 335 holds the stylus 320 gently in place on the support 333, located by the forks 333A and by a peg 380 in a hole 381 in the support 333.

The holder 310 has a housing 312 including a fork-shaped support 313 on which said other elements 325 are provided. The gap between these forks is wide enough to straddle the support 333. Further, the holder 310 has a pressure device 314 being in the form of an arm 315 connected at one end to the housing 312 by a pivot 316 and generally being situated in a position confronting the elements 325. The other end of the arm is provided with a roller 317. The arm 315 is urged against a stop 318 by a torsion spring (not shown) at the pivot 316 and is withdrawable from the stop 318 generally in the direction away from the open end 313A of the support 313.

Figure 16:
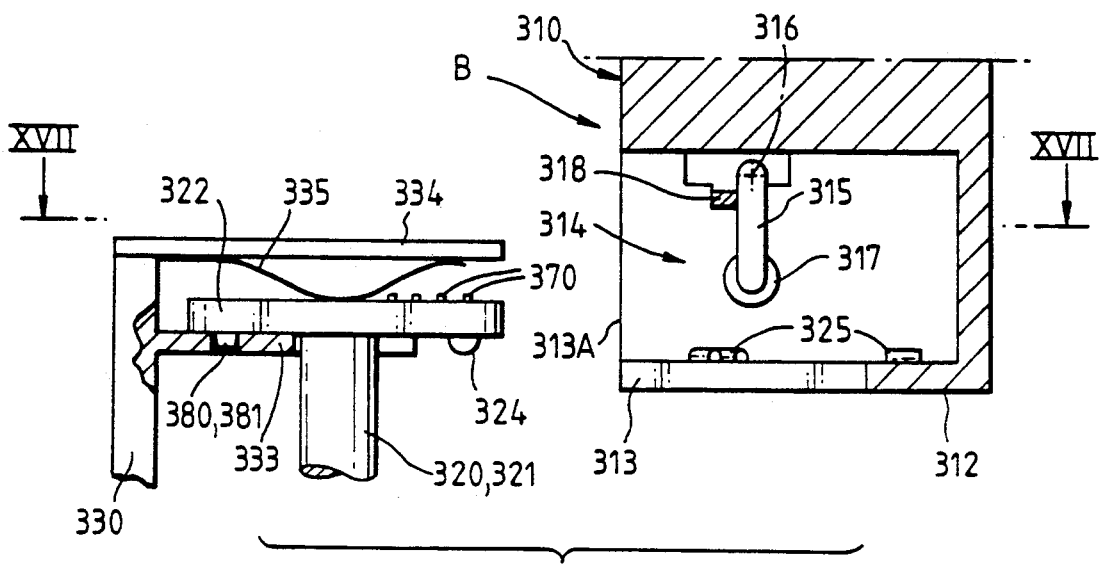
FIG. 16 is an enlarged detail of FIG. 14 and shows a first operational position.
Figure 17:
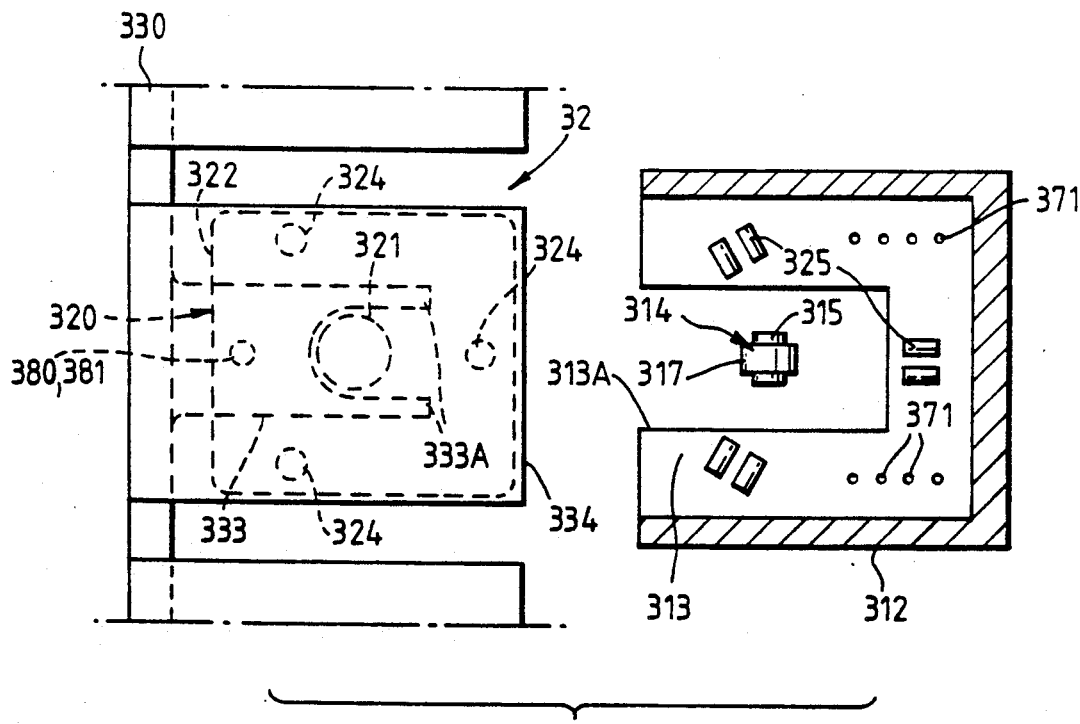
FIG. 17 is a section on the line XVII—XVII in FIG. 16.

In operation, when it is required for the holder 310 to pick up a stylus 320 from the magazine 330, the operating member 311 is moved into the position B adjacent the relevant magazine station 332, as shown in FIGS. 16 and 17. In that position the open ends of the fork-shaped supports 313, 333 confront each other in the X direction, the support 333 being situated at a level below the support 313 and the arm 315 being situated at a level generally above the plate 322.

Figure 18:
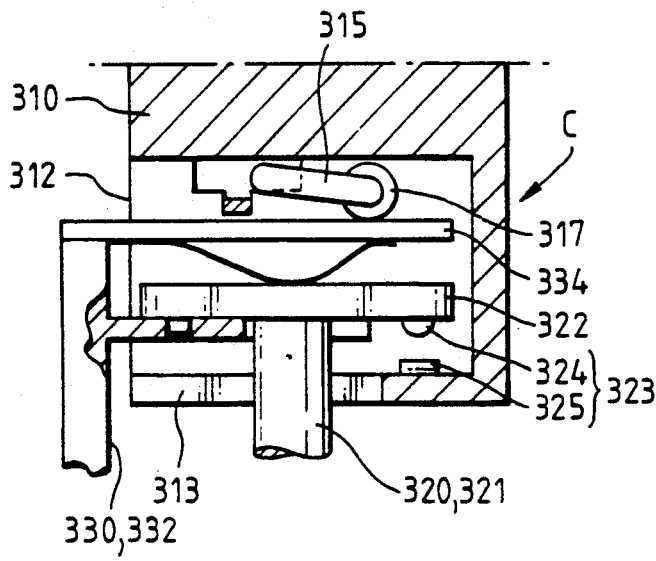
FIGS. 18, 19 and 20 show respectively a second, third and fourth operational position of the device of FIG. 16.

Thereafter the member 311 is moved in the X-direction toward the stylus 320 until the holder 310 attains a position C (FIG. 18) in which the elements 324, 325 confront each other in the Z-direction. During the movement between the positions B, C there occurs engagement between the roller 317 and a release member or extension 334 provided on the magazine 330 in a position above the plate. The arrangement is such that the extension 334 raises the arm 315 and prevents engagement thereof with the plate 322.

Figure 19:
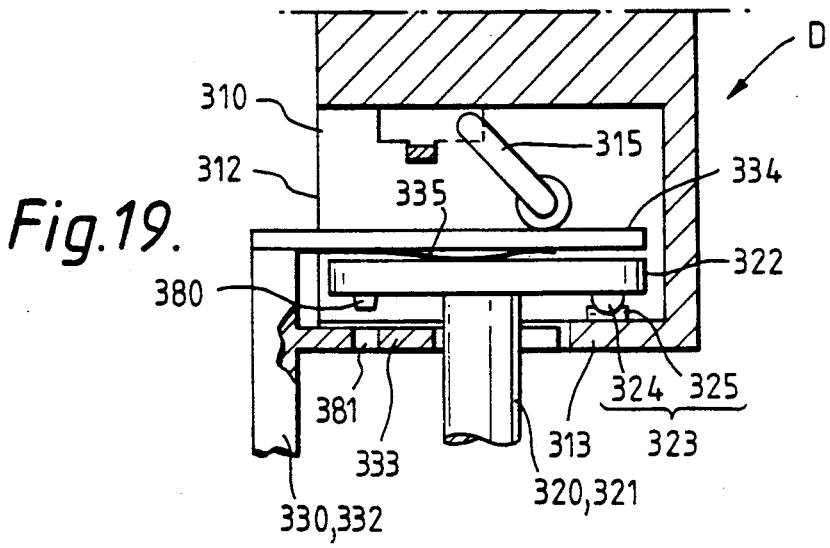

Following attainment of position C, the member 311 is moved to move the holder 310 upwards in the Z-direction into a position D (FIG. 19) in which the elements 324, 325 become engaged and, following such engagement, the plate 322 is lifted clear of the support 333.

Figure 20:
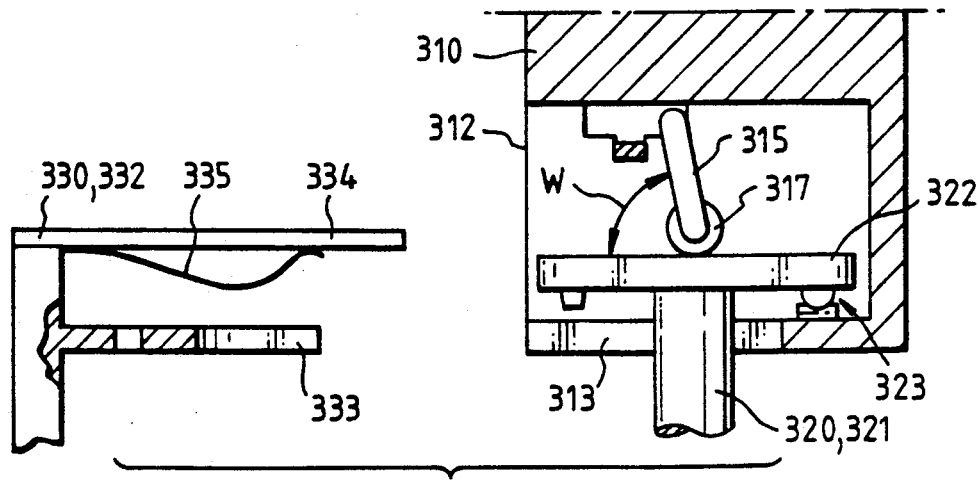

Lastly, the member 311 is moved in the X-direction (FIG. 20) in the sense of retracting the holder 310 from the magazine 330. The engagement of the elements 324, 325 is now substantially sufficient for the stylus 320 to be removed from the magazine together with the holder 310 but the light leaf spring 335 under the extension 334 assists in holding the elements 324, 325 in engagement during the movement. Toward the end of the movement the arm 315 drops away from the extension 334 and the roller 317 drops onto the top of the plate 322 of the stylus 320 as supported on the elements 324, 325.

The length of the arm 315 is so chosen that a relatively large angle W is formed between the arm and the plate 322 and a correspondingly large downward pressure is exerted on the plate 322 to retain the stylus in position with appropriate firmness.

When it is desired to return the stylus to the magazine, the holder is simply returned to position D, lowered into position C and withdrawn into position B. The extension 334 removes the arm 315 from engagement with the plate 322 as the position D is approached.

Figure 21:
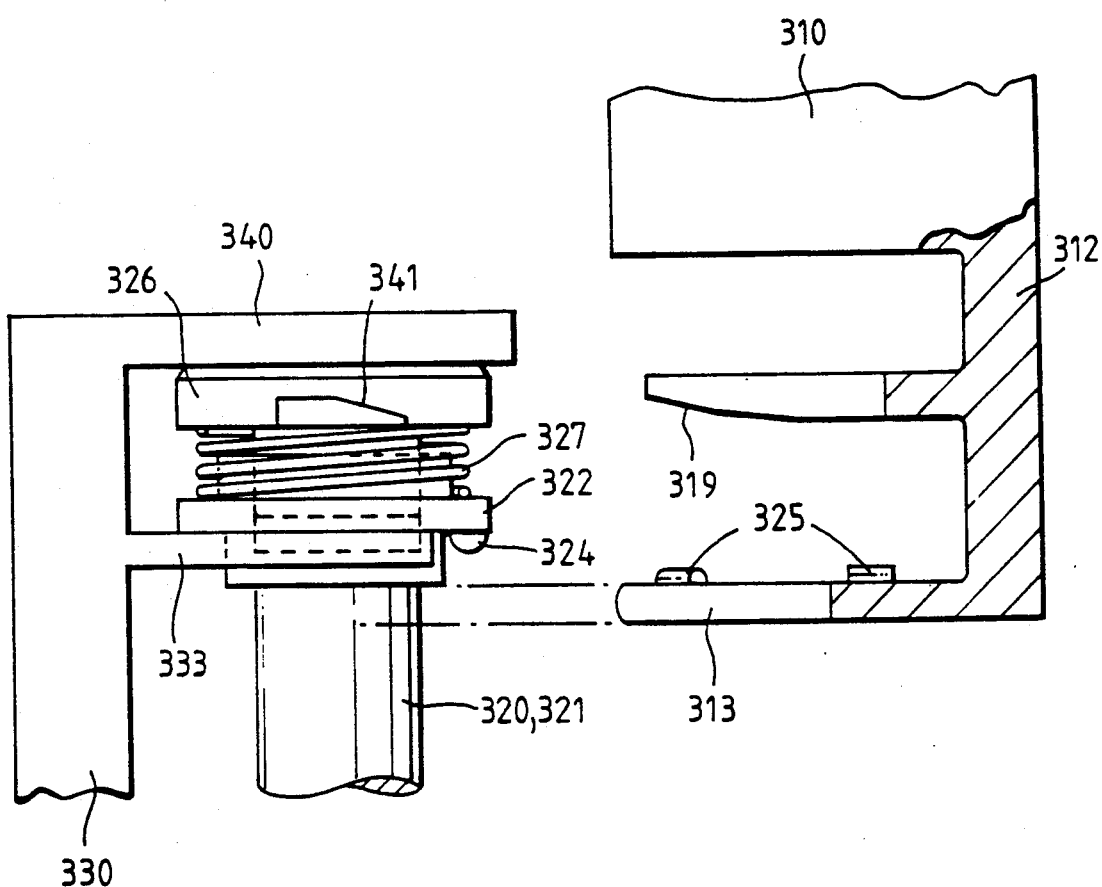
FIG. 21 is a view similar to FIG. 16 but shows a modification.

In a modification (FIG. 21) a pressure member 326 is provided on the top of the plate 322 and spring-loaded by a spring 327 so that when the stylus is engaged with the magazine, member 326 engages a roof portion 340 of the magazine and urges the plate 322 against the support 333. The holder 310 is provided with a forked extension 319 adapted to straddle the member 326 and engage ramps 341 on each side of the member 326 to urge the latter toward the plate 322 against the pressure of the spring 327. Subsequent lifting of the holder 310 engages the elements 324, 325 under the pressure of the spring 327, and the stylus is removable by the holder from the magazine. The reverse operation enables the stylus to be returned to the magazine. When held in the holder, the pressure member 326 acts against the forks 319 to urge the kinematic support elements into engagement with each other.

Another type of device which can be stored in one or more of the stations of the magazine is an extension bar, used to lengthen the stylus or probe in order to inspect relatively inaccessible parts of a workpiece. Such extension bars are know, and in the present case would have a plate such as 322 at the top end, with a holder similar to the holder 310 at the bottom end. Once such an extension bar has been picked up from one station of the magazine, therefore, it can then go on to pick up a stylus or probe from another station of the magazine.

Figure 22:
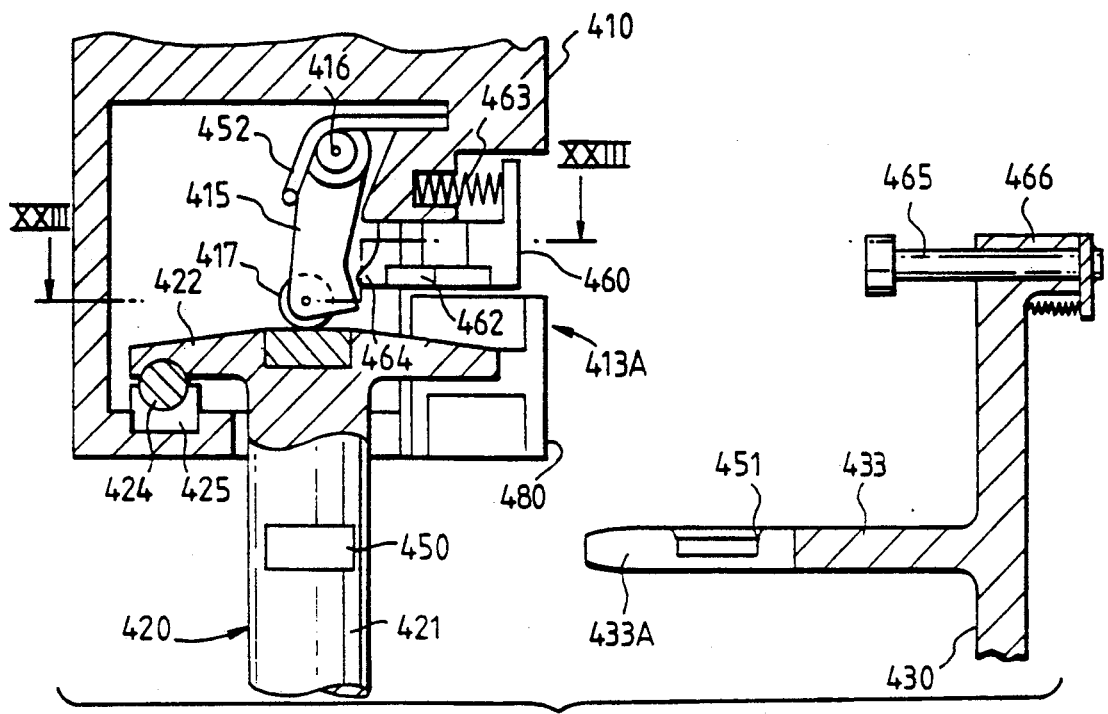
FIG. 22 is a vertical section of another modification of the device of FIG. 16.
Figure 23:
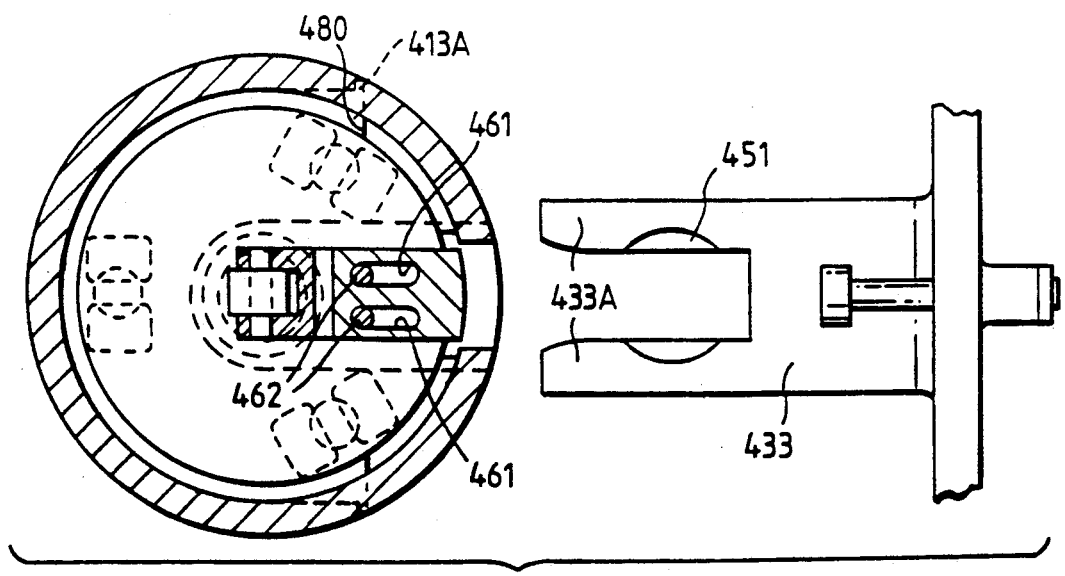
FIG. 23 is a section on the line XXIII—XXIII in FIG. 22.

FIGS. 22 and 23 show another modification of the device of FIG. 16. As previously, a magazine 430 has stations for holding several styli 420, which can be picked up from and deposited at their respective stations by a holder 410 on the quill of the measuring machine. At each station, the magazine 430 has a forked support 433, which supports the stylus 420 between its fork 433A. The elongate member 421 of the stylus 420 has a flat portion 450 machined on each of its sides, forming grooves which engage with the forks 433A. The forks have a circular recess 451 in their upper surface. When the stylus 420 is held by the support 433, therefore, the forks 433A cooperate with the grooves 450 to ensure that the stylus is correctly oriented about a vertical axis for presentation to the holder 410, while the circular recess 451 locates the cylindrical surface of the elongate member 421 in the correct location in the horizontal plane.

As previously, the stylus 420 has a plate 422, on the underside of which are balls 424 which engage with pairs of rollers 425 on the holder 410, to provide a kinematic support for the stylus in use. The balls 424 are biased into engagement with the rollers 425 in use by a roller 417 on an arm 415, under the loading provided by a torsion spring 452.

One important modification of the present device over that of FIG. 16 is the provision of a manually-operable button 460, which enables the arm 415 to be rotated manually about its pivot point 416, out of contact with the plate 422 of the stylus. This enables the stylus to be removed from the holder 410 by hand if desired. The button 460 has two slots 461 which cooperate with two screws 462 to enable the button 460 to slide horizontally in and out. It is biased into the radially outward position by a compression spring 463. The button 460 has a nose 464 which engages the arm 415 when the button is depressed against the action of the spring 463.

It would be possible to provide a fixed extension plate above the support 433, which would engage the button 460 during the normal automatic stylus changing operation, in exactly the same way as the extension plate 334 in the device of FIG. 16. Such an extension plate would of course need to be a little shorter than the extension plate 334, to take account of the depth of the button 460.

However, in the device as shown in FIG. 22, we instead provide a push rod 465 at each station of the magazine 430. The rod 465 is positioned to engage the button 460 as the holder 410 approaches the forks 433A, and to slide backwards in a bore 466 when it does so. This backwards sliding is against the action of a spring 467. The spring rates and pre-loadings of the springs 463, 467 are chosen, relative to each other, such that the pressure of the arm 415 on the plate 422 is applied and released more gradually than would be the case with a fixed extension such as 334. Thus, when the holder 410 is depositing the stylus 420 in the magazine station, and brings the stylus horizontally so that the grooves 450 engage in the forks 433A, it is possible to arrange that there will still be a light pressure from the arm 415 holding the stylus gently in position in the holder. This replaces the light pressure applied by the leaf spring 335 in the corresponding position shown in FIG. 19. The light pressure ensures that the stylus is held in position until the holder 410 is lowered to disengage the balls 424 and rollers 425, whereupon the stylus is lowered into the recess 451 which then provides the necessary location to hold the stylus in position. Similarly, because the rod 465 can also be arranged to allow the arm 415 to engage the plate 422 with a light pressure during the pick-up operation, this ensures that the balls 424 and rollers 425 are sufficiently biased together to enable the holder 410 to remove the stylus 420 horizontally from the magazine station once it has picked it up. As the stylus is removed horizontally by the holder 410, of course, the rod 465 disengages from the button 460 to ensure that the arm 415 holds the stylus 420 securely in its kinematic support.

FIGS. 22 and 23 also show an arcuate cover 480 which is attached to the plate 422 of each stylus in the magazine. This arcuate cover 480 closes the opening 413A of the holder 410 when the stylus is in position in the holder, so as to protect against the ingress of dust and other contaminants.

All the embodiments shown in the accompanying drawings have had stylus units stored in the stations of the magazine, and the means for detecting when the stylus contacts a work piece has been in the holder mounted on the quill of the machine. However, if desired, a complete probe unit may be stored in each of the stations of the magazine, in any of the embodiments described. Taking the embodiment of FIGS. 16 and 17 as an example, this simply entails replacing the elongate stylus member 321 with a complete probe of known design, such as shown in U.S. Pat. Nos. 4,153,998 or 4,702,013. This involves the addition of the plate 322 with its support elements 324 to the top of the existing design of probe.

The electrical connections for the probe can be in the form of contacts 370 on the upper surface of the plate 22, which mate with corresponding contacts 371 on the housing 312 when the kinematic support elements 324, 325 are engaged. One or other of the sets of contacts should be lightly sprung to ensure proper electrical contact without interfering with the kinematic support. Where such electrical connections are provided, it is particularly advantageous that they should confront each other in the same direction as the direction of movement which brings the kinematic support elements together during the automatic change operation. This ensures that there is no risk of the contacts fouling and damaging each other, as might happen if they were bough together in a transverse direction. Of course, the electrical contacts 370, 371 are omitted in the case of a simple stylus 320 not requiring any electrical connections.

It is among the advantages of the various embodiments described above that the sensing device, (e.g., a stylus, extension bar or probe) can be transferred between the holder and the magazine without the need for any electrical device e.g., a motor or a magnet in either the magazine or the holder. In each case, the sensing device is picked up and deposited simply by the translational movements of the holder, in the X, Y and Z directions, which are the normal movements that the positioning machine would be designed to make in any case.

Another important advantage of the embodiments described is that the stylus, probe or extension bar is supported kinematically when it is in the holder. Thus, if it is redeposited in the magazine, it can subsequently be picked up again, and the kinematic seating will ensure that it occupies exactly the same position with respect to the holder as previously. There is therefore no need for the stylus or probe to be redatumed or recalibrated each time it is picked up.

Although described with respect to coordinate measuring machines, the changing apparatus described can of course equally be used to change sensing devices or other tools, e.g., cutting tools, in a machine tool. It can also be used to change sensing devices in an inspection robot.

We claim:

1. A magazine, for storing at least one sensing device within the working area of a coordinate positioning machine, comprising:
    at least one support member for releasably supporting the sensing device in a stored position, each support member having a slot at one end for retaining the sensing device;
    means provided at another end of the support member for supporting the one end of the support member for pivotal motion about an axis, thereby to provide motion of the slot along a circular path with respect to the axis;
    a panel fixed relative to the at least one support member, wherein the one end of each support member is moveable between a first position in which the slot is housed under the panel and a second position in which the slot is exposed; and
    an operating member provided on the at least one support member, lying outside the panel when the support member is in the first position and being engageable by a holder to move the support member from the first position to the second position, thereby to expose the slot.

2. Apparatus for changing a sensing device in a positioning machine having a holder movable by the machine, the holder having a first set of support elements and the sensing device having a second set of support elements engageable with the first set of support elements, the apparatus including a magazine for storing the sensing device comprising:
    a support member for releasably supporting the sensing device, the support member being movable between a first position and a second position;
    a panel, fixed relative to the support member, the support member being housed under the panel in the first position; and
    an operating member provided on the support member, the operating member lying outside the panel in the first position and being engageable by the holder to move the support member from the first position to the second position thereby to expose the second set of support elements;
    wherein when the holder and operating member are engaged, the first and second support elements lie in register.

3. Apparatus according to claim 2, wherein the operating member extends above the panel.

4. Apparatus according to claim 3, wherein the support member has a first slot for retaining the sensing device, and the operating member has a second slot for engaging the holder, the first and second slots lying in register.

5. Apparatus according to claim 4, wherein the sensing device is engageable and disengageable with the first slot in a first direction, and the holder is engageable and disengageable with the second slot in said first direction.

6. Apparatus according to claim 5, wherein the support member is pivotable about an axis, and the first direction extends radially with respect to the axis.

7. Apparatus according to claim 2, the sensing device having an annular wall extending around the second support elements and forming a seal with the panel when the sensing device is supported by the support member and the support member is in the first position.

8. Apparatus comprising:
    a sensing device for sensing a surface, having a set of support elements engageable by a further set of support elements provided on a holder supported on a positioning machine; and
    a magazine for storing the sensing device having: a support member for releasably supporting the sensing device, the support member being movable between a first position and a second position; a panel, fixed relative to the support member, the support member being housed under the panel in the first position; and operating member provided on the support member, the operating member lying outside the panel in the first position and being engageable by the holder to move the support member from the first position to the second position thereby to expose the second set of support elements.

9. A magazine for storing at least one sensing device within the working area of a coordinate positioning machine, the sensing device having a set of support elements, the magazine comprising:
    at least one support member for releasably supporting the sensing device in a stored position, each support member having a slot at one end for retaining the sensing device;

means provided at another end of the at least one support member for supporting the one end of each support member for pivotal motion about an axis, thereby to provide motion of the slot along a circular path with respect to the axis; and a panel fixed relative to the at least one support member;

wherein the one end of the at least one support member is movable between a first position in which the slot is housed under the panel and a second position in which the slot is exposed, and an annular wall extends around said set of support elements and forms a seal with said panel when the sensing device is supported by the at least one support member and the one end of the at least one support member is in the first position.

10. A magazine according to claim 9, wherein the slot further comprises guide means for guiding movements of the sensing device in the slot transverse to the circular path.

11. A magazine according to claim 10, wherein the guide means comprises a pair of substantially parallel surfaces.

12. A magazine according to claim 11, wherein said surfaces extend in a radial direction with respect to said axis.

13. A magazine according to claim 1, wherein the operating member extends above the panel.

* * * * *